J. G. Smith.
Hames and Collar.
N° 98,311. Patented Dec. 28, 1869.
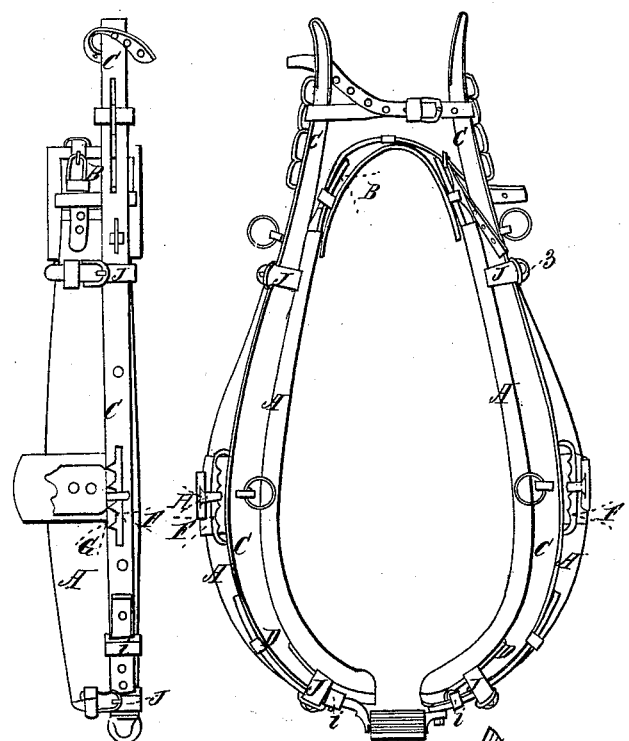
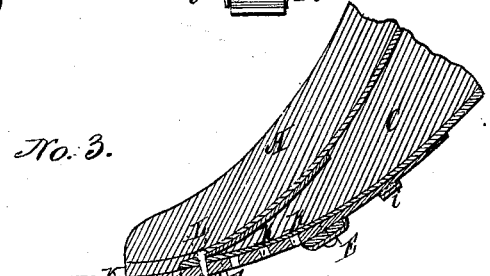
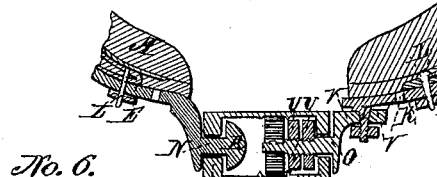
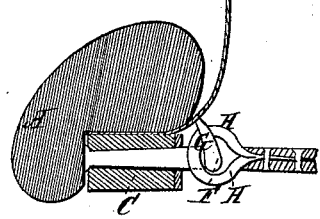
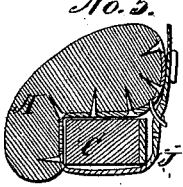
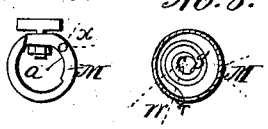
Witnesses
O. E. Woodbury
O. W. Judd
Inventor
John. G. Smith

United States Patent Office.

JOHN G. SMITH, OF OREGON, WISCONSIN, ASSIGNOR TO HIMSELF AND FRANK A. VICKERY, OF MASON CITY, ILLINOIS.

Letters Patent No. 98,311, dated December 28, 1869.

IMPROVEMENT IN HAMES AND COLLARS.

The Schedule referred to in these Letters Patent and making part of the same

*To all whom it may concern:*

Be it known that I, JOHN G. SMITH, of Oregon, Dane county, Wisconsin, have made new and useful Improvements in Hames and Horse-Collars; and I do hereby declare the following to be a full, clear, and exact description of the nature, construction, and operation of the same, sufficient to enable one skilled in the art to which it appertains, to construct and use the same, reference being had to the accompanying drawings, which are made part of this specification, and in which—

Figure 1 is a front view.

Figure 2 is a side view.

Figure 3 is a longitudinal section of the swivel and hinge-joint fastening.

Figure 4 is a cross-section of draught-staple and collar.

Figure 5 is a cross-section, showing fastening of hames to collar.

Figure 6, section, showing leather extension at top of collar.

Figure 7 shows end view of lock.

Figure 8 shows cross-section of centre of lock and coil-spring.

Figure 9, end view, showing oblong hole in end of lock.

The invention consists in the use of a wooden collar, open at the bottom, and joined together at the top by pieces of leather, or other material, thus leaving the two sides of the collar at liberty to adjust themselves to the motions of the shoulders of the horse.

It further consists in extending the top of a wooden collar with leather, or other material, so as to enable it to conform to the shape of the horse's neck.

It further consists in attaching the hames to the collar, so as to make the hames and collar only one piece, in handling the harness, they being readily separated for the purpose of adjustment in fitting different-sized horses.

It also further consists in the use of a swivel and hinge-joint fastening at the bottom of the hames, said fastening being adjustable on the hames, so as to make the hames and collar open, more or less, at the bottom, thus fitting different sizes of horses, and also allowing the opposite sides of the hames and collar to accommodate themselves to the forward and backward motions of the shoulders of the horse, each side independent of the other.

It further consists in the manner of making the adjustment between the metallic straps and the lower end of the hames, to change the size of the collar and hames.

It further consists in the manner of adjusting the point of draught upon the hames.

It further consists in the manner of attaching the hames to the collar.

I make the wooden collar A, fig. 1, the same shape as an ordinary horse-collar, and extend the upper end by attaching thereto pieces of leather B, fig. 6, of the same shape as the upper end of the wooden collar, and slipped over the ends of the same, where they are fastened, by nailing or otherwise. To the top end of these extensions, I attach straps and buckles, in the ordinary manner, by means of which I widen or lengthen the collar at pleasure.

The hames C, fig. 1, are of the general shape of other hames, excepting at the lower end D, fig. 1, where the curve assumes a true circle, so as to always fit the straps E, fig. 3, which are of the same circle.

The hames are provided at the top with a series of staples, through which an ordinary leather strap is passed, to unite their upper ends above the collar.

At the point of draught upon the hames, they are provided with a wide staple, F, fig. 1, having several pins, projecting, at G, fig. 4, backward toward the collar, far enough to prevent the eye H, fig. 4, of the tugs or traces, from unhooking. This device enables me to change the point of draught up or down, to suit the horse.

Near their lower ends, the hames are provided with bands or guards I, fig. 1, through which the adjusting-straps E are passed.

The hames are secured to the collar by means of straps J, figs. 1 and 2, which are fastened to the collar, and buckled tightly around the hames.

The straps E are pierced with a series of holes, K K K, figs. 2 and 3, and the lower ends of the hames are also pierced with holes, which pass as well through the lower guard I.

The straps E, being passed through the guards I, and brought to the hole desired, the pin L, fig. 3, is passed from the inside through the hole in the hames, and through the strap E, thus securing the strap at the desired point of adjustment.

The hames and collar are made larger or smaller by changing the pin L to or from the end of the strap.

The swivel and hinge-joint fastener N' consists of a barrel, M, figs. 3 and 8, with openings at each end, as shown at N O, fig. 3, the opening at O being round, to receive the bolt P, fig. 3, and that at the other end, N, being oblong, as shown at Q, fig. 9, to receive the widened end of the hook R, fig. 3.

The bolt P has upon its inner end a small hook, W, fig. 8, which engages with the coil-spring S, fig. 8, in the centre of the coil, the other end of the spring being fastened to the barrel M, at T, fig. 8.

The bolt P is secured in its place by two check-nuts U U, fig. 3, these nuts being passed into the barrel for that purpose, at the opening Q, fig. 9.

By taking hold of the barrel M and turning it one-quarter of a revolution, the hook R can be withdrawn, and the hames and collar will then come off from the horse together. By making the same turn of the barrel, the hook may be inserted in its place, and upon releasing the barrel, the action of the coil-spring S brings it back to its former position, and the hook is retained in its place.

The head of the bolt P has an extension, shown at V V, fig. 3, pierced with a hole, through which the pin I, fig. 3, projecting from the lower end of the strap E, is passed, and secured by a nut, thus making a hinge-connection between the strap E and the bolt P, fig. 3.

A hinge-joint is made at the opposite end of the barrel M, by means of the hook R and the head of the barrel, the oblong slot in the latter affording ample room for the movement of the neck N of the hook in the proper direction to correspond with the movement of the joint at V V.

The head of the bolt P has a notch, a, fig. 7, extending one-quarter of the distance around its circumference, into which a pin, X, fig. 7, engages, the pin being set into the head of the barrel for that purpose. This pin is so set as to prevent the barrel from being turned in either direction more than one-fourth of a revolution, which is sufficient to lock or unlock the hames and collar.

The coil-spring S, fig. 8, is introduced into the barrel at the opening T, figs. 3 and 8, in the side of the same.

The above-described hames and fastenings may be used with any and all descriptions of collars.

What I claim as my invention, and desire to secure by Letters Patent, is—

1. The swivel and hinge-joint fastening N, constructed substantially as described.

2. The swivel and hinge-joint fastening N, in combination with the adjustable straps E, when constructed and arranged substantially as described.

3. The adjustable wooden collar A, having the leather extension B, in combination with the hames C, when constructed with the swivel and hinge-joint fastening N and adjustable strap E, substantially as and for the purpose described.

4. The adjusting toothed staple F, so constructed and arranged that the trace can only be adjusted when the hames are removed from the collar, substantially as described.

JOHN G. SMITH.

Witnesses:
O. E. WOODBURY,
O. W. JUDD.